Figure 1:
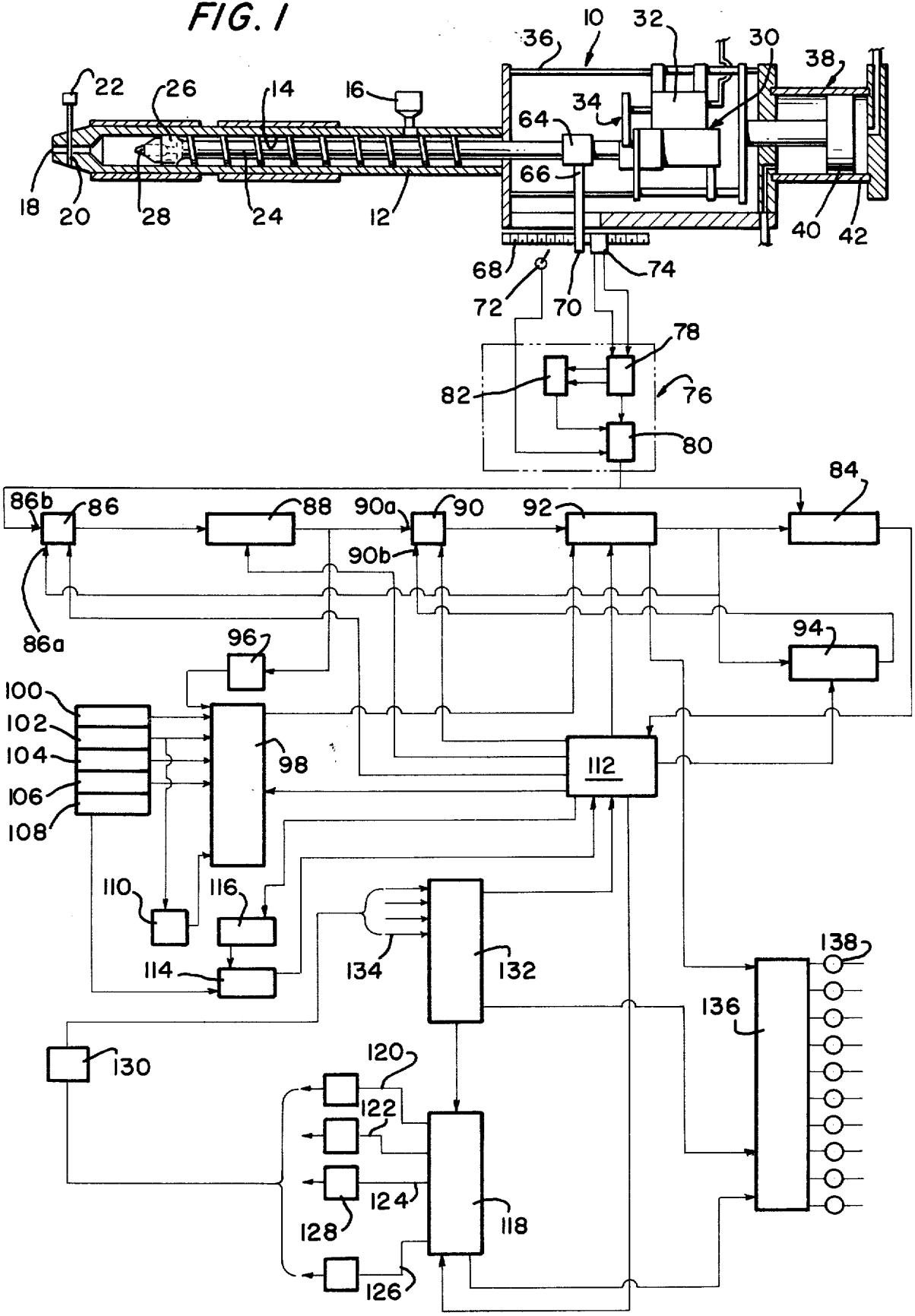

United States Patent [19]
Mahoney

[11] 3,888,388
[45] June 10, 1975

[54] APPARATUS AND METHODS FOR CONTROLLING INJECTION RAMS

[75] Inventor: Francis E. Mahoney, Merrimack, N.H.

[73] Assignee: Ingersoll-Rand Company, Woodcliff Lake, N.J.

[22] Filed: Nov. 1, 1973

[21] Appl. No.: 411,895

[52] U.S. Cl. .................. 222/1; 222/63; 222/413; 425/145; 425/166
[51] Int. Cl. ............................................. B29f 1/02
[58] Field of Search ......... 222/1, 63, 333, 334, 413; 425/145, 166

[56] References Cited
UNITED STATES PATENTS

| | | | |
|---|---|---|---|
| 3,436,443 | 4/1969 | Hutchinson | 425/145 UX |
| 3,642,402 | 2/1972 | Hutchinson et al. | 222/413 UX |
| 3,693,946 | 9/1972 | Merritt | 425/145 X |
| 3,697,204 | 10/1972 | Kyritsis et al. | 425/145 UX |
| 3,750,134 | 7/1973 | Weisend | 425/145 X |
| 3,752,363 | 8/1973 | Fegley et al. | 222/63 |
| 3,756,456 | 9/1973 | Georgi | 222/1 |
| 3,797,808 | 3/1974 | Ma et al. | 222/63 X |

*Primary Examiner*—Robert B. Reeves
*Assistant Examiner*—David A. Scherbel
*Attorney, Agent, or Firm*—Robert R. Paquin

[57] ABSTRACT

Apparatus and methods for controlling the driven axial movement of a ram which is forwardly driven from a variable position for discharge of processed fluent material through a barrel discharge opening, wherein a signal is provided to indicate the actual location of the ram when the ram is in said variable position, and forward displacement of the ram from said variable position is controlled dependent upon such indicated actual ram location to maintain predetermined ram forward displacement from said position.

19 Claims, 3 Drawing Figures

3,888,388

PATENTED JUN 10 1975

SHEET 1

APPARATUS AND METHODS FOR CONTROLLING INJECTION RAMS

The present invention relates generally to apparatus and methods for controlling the movement of an axially driven member and more specifically to apparatus and methods particularly adapted for controlling the driven axial movement of an injection ram or screw of injection molding apparatus.

During the operation of injection molding apparatus, the initial forward driven movement each cycle of the injection ram towards the barrel discharge opening does not discharge material through the opening. Rather, such initial ram movement causes prepacking of material in the barrel forwardly of the ram while forwardly displacing the ram a distance variable during different operating cycles to a position resultantly variable during different operating cycles. Then, after the machine control provides the injection command, the ram is further forwardly driven from such variable position to displace material through the barrel opening for initial filling of the mold and, after such initial mold filling, further forward driven movement of the ram provides the mold with such minor volume of additional material as may be necessary to compensate for shrinkage. The length of the ram forward driven stroke commencing at the beforedescribed variable position, and particularly the length of the portion of such ram forward stroke commencing at said ram variable position and terminating at the position of the ram at the end of the initial mold filling (such portion of the ram forward stroke being hereinafter called the injection-fill stroke of the ram), and such ram displacement during this stroke being hereinafter called the injection stroke displacement of the ram, determines the quantity of material available in the mold for part formation.

In the manufacture of high precision molded parts, the volume of material charged into the mold by the injection ram must be controlled with great accuracy. Also, in the molding of other parts, substantial savings can be realized if the volume of material charged into the mold can be maintained low to minimize the maximum material included in each part.

An object of the present invention is to provide new and improved apparatus and methods particularly adapted for controlling the driven axial movement of an axially driven member such as an injection ram or screw.

Another object of the invention is to provide new and improved controlling apparatus and methods of the type set forth particularly adapted to provide extremely accurate control of the ram movement.

Another object is to provide new and improved controlling apparatus and methods of the type set forth particularly adapted to maintain a predetermined ram forward movement from the beforedescribed variable ram position.

Another object is to provide new and improved controlling apparatus and methods of the type set forth particularly adapted to control the ram forward movement to maintain a predetermined injection stroke displacement of the ram by its injection-fill stroke regardless of the actual variable position of the ram at which it commences such stroke.

Another object is to provide new and improved controlling apparatus and methods of the type set forth particularly adapted to control the ram forward movement to maintain a predetermined total axial displacement of the ram by its overall forward movement from such variable ram position.

Other objects and advantages of the invention will be apparent from the following description taken in connection with the accompanying drawings; and it will be understood that, although the preferred embodiments of the invention have been illustrated and specifically hereinafter described, such embodiments have been given for the purposes of illustration only.

In accordance with the present invention, the movement of a ram disposed in a barrel for processing fluent material therein and axially driven from a variable position substantially spaced from a barrel discharge opening towards such opening to discharge processed material therethrough, may be controlled by apparatus comprising means for providing a signal indicating the actual location of the ram when the ram is in such variable position, and control means for controlling at least a portion of the driven movement of the ram from such variable position towards such discharge opening dependent upon such indicated ram location for maintaining a predetermined axial displacement of the ram by such ram movement.

Also, in accordance with the invention the movement of a ram disposed in a barrel for processing fluent material therein and axially driven from a variable position to discharge processed material through a barrel discharge opening, may be controlled by a method comprising the steps of determining the actual position of the ram when the ram is in said variable position, and controlling at least a portion of the driven movement of the ram from such variable position towards such discharge opening dependent upon actual position to maintain a predetermined axial displacement of the ram by such ram movement.

Figure 2:
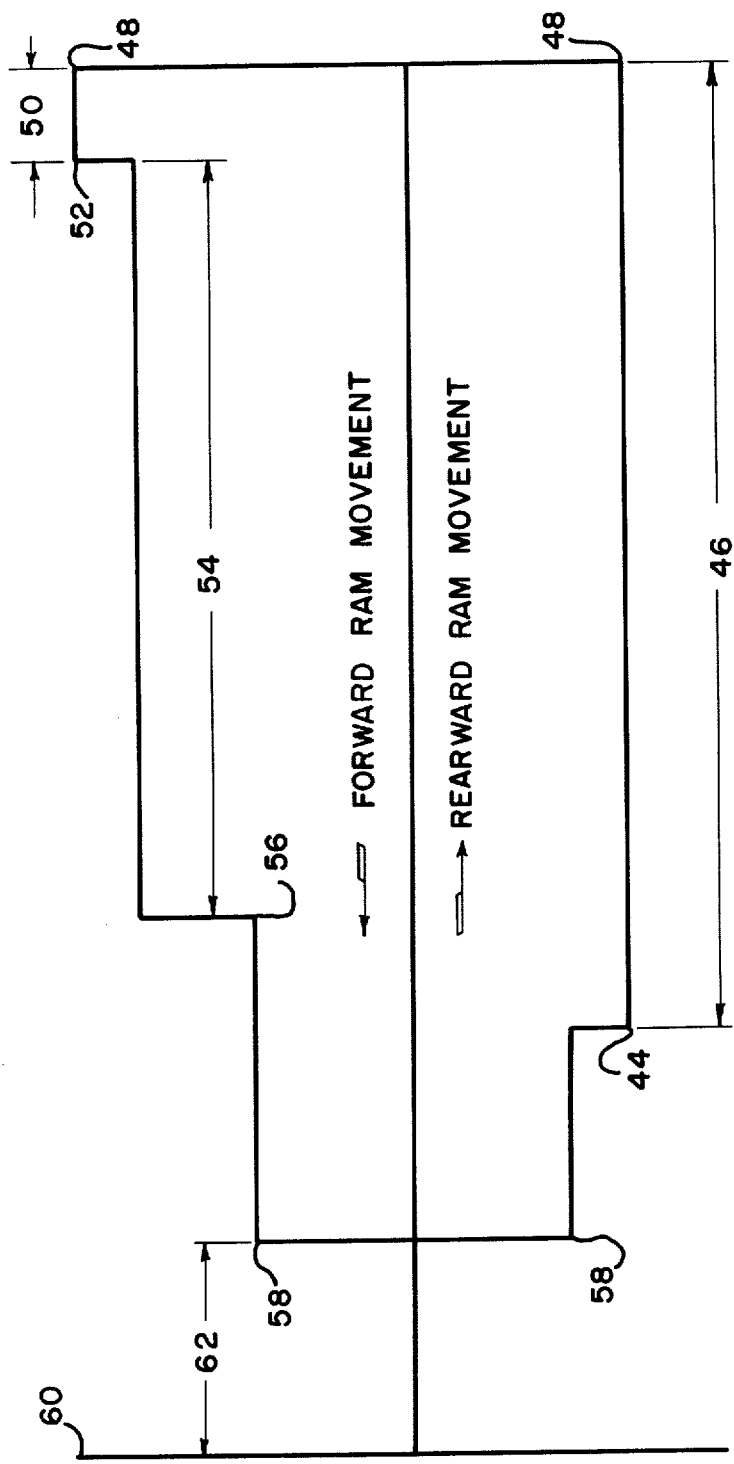
Figure 3:
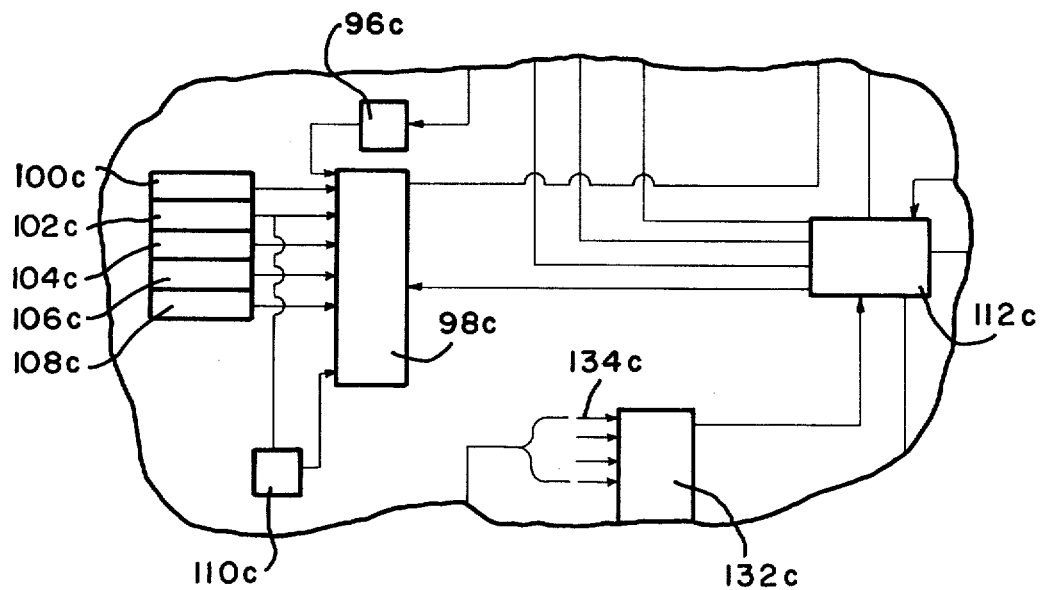

Referring to the drawings:

FIG. 1 schematically illustrates an injection molding apparatus provided with an embodiment of the controlling apparatus of the invention;

FIG. 2 is a view schematically depicting one cycle of the driven axial movement of the ram shown in FIG. 1; and FIG. 3 fragmentarily schematically illustrates a second embodiment of such controlling apparatus.

Referring more particularly to the drawings, FIG. 1 schematically illustrates an injection molding apparatus, designated generally as 10, comprising an injection barrel 12, the interior of which forms an injection bore 14 communicating adjacent its rearward or right-hand end with a feed hopper 16 and also communicating at its forward or left-hand end with the barrel discharge opening 18. The discharge opening 18 is, as conventional, arranged to supply the plasticized or processed fluent material to a conventional mold (not shown), and is provided with the usual normally closed, shut-off valve 20 operated by a conventional control 22 to selectively permit discharge of material from the bore 14 through the opening 18 to the mold.

The bore 14 contains a conventional injection ram or screw 24, the forward or left-hand end of which is shown as carrying a conventional valving head 26 which may be, for example, of the construction described in U.S. Pat. No. 3,438,393, issued Apr. 15, 1969 and assigned to the assignee of the present invention. The valving head 26 includes the usual passages through which the plasticized or processed fluent material must flow to pass to the portion of the bore 14 forwardly of the ram 24 and also a non-return or check valve 28 preventing reverse flow of the material through such passages. The rearward or right-hand end of the ram 24 projects from the bore 14 and is connected to a carriage, designated generally as 30, such that the ram 24 is axially movable conjointly with, and rotatable relative to, the carriage 30. The carriage 30 carries a conventional hydraulically operated rotary motor 32 connected to the ram 24 by suitable convention gearing 34 to rotatably drive the ram 24. The carriage 30 is slidably mounted on tie rods 36 for axial movement towards-and-away from the barrel 12 and is axially driven towards the barrel 12 by a hydraulic actuator, designated generally as 38, the actuator 38 including a piston 40 connected to the carriage 30 for movement therewith and a stationary cylinder 42.

A brief description of the operation of the beforedescribed portions of the molding apparatus 10 will now be given to insure understanding of the following description of the illustrated embodiment of the controlling apparatus; and one cycle of such operation is, as will be understood, schematically depicted in FIG. 2.

During such operation, assuming the ram 24 to be at its pull-back position 44, the rotary motor 32 is actuated to rotatably drive the ram 24 through the gearing 34 while material to be plasticized or processed by the ram 24 is supplied from the hopper 16 to the bore 14. The driven rotation of the ram 24 plasticizes or processes such supplied material and conveys the processed fluent material through the passages in the valving head 26 to the portion of the bore 14 forwardly of the ram 24 where, the shut-off valve 20 being closed, the processed fluent material remains. After the volume of such material in the bore 14 forwardly of the ram 24 fills the then available space in the bore 14, the further plasticized or processed fluent material supplied forwardly of the ram 24 axially displaces or rearwardly drives the ram 24 away from the discharge opening 18. After the ram 24 has been so rearwardly driven a distance 46 controlled in a manner to be hereinafter described and the ram 24 is in its extreme rearward position 48, the ram rotation is stopped and hydraulic fluid is supplied to the cylinder 42 for forwardly axially displacing the ram from such position 48 towards the discharge opening 18. The initial forward driven movement of the ram 24, however, displaces no plasticized material through the opening 18, but rather merely causes the ram 24 to prepack the fluent material in the bore 14 forwardly of the ram 24 while such material closes the non-return valve 28. Such initial forward displacement of the ram 24 does, however, forwardly move the ram a distance 50 variable during different operating cycles to an axial position 52 substantially spaced from the opening 18 and also variable during different operating cycles. The valve 20 is opened; and further forward driven movement of the ram 24 axially advances the ram 24 from the variable position 52 in an injection-fill stroke of length 54 (the injection stroke displacement) to discharge the material from the bore 14 through the opening 18 until the mold is initially filled with the material. After such injection-fill stroke 54, the ram 24 is further forwardly displaced from the position 56 marking the end of such stroke to a position 58 spaced rearwardly of the most extreme possible forward position 60 of the ram 24 by a cushion or space of length 62, whereby the ram 24 is caused to discharge an additional minor amount of material compensating for shrinkage in the mold. In the normal manner, the ram is subsequently pulled-back from its position 58 resulting thereafter to the ram axial position 44; and the ram 24 is continuously cyclically driven in the beforedescribed manner throughout the operation of the apparatus 10.

In the illustrated embodiment of the controlling apparatus, the ram 24 carries a collar 64 which is mounted to the ram 24 in a manner causing the collar 64 to be conjointly movable with the ram 24 during the ram axial movement, but permitting rotation of the ram 24 relative to the collar 64. The collar 64 fixedly carries a depending arm 66 which, in turn, fixedly carries a scale element 68 whereby the scale 68 is resultantly axially movable commensurately with the ram axial movement. The arm 66 includes a switch actuating portion 70; and a limit switch 72 is positioned at a location a predetermined, relatively short, axial distance rearwardly of the most extreme forward position 58 of the ram 24, the limit switch 72 being of the type to be unaffected by engagement by the actuating portion 70 during forward movement of the ram 24 but actuated by the portion 70 during the ram rearward movement.

A position transducer, shown as a conventional optical encoder 74 having the usual photo cells and disks but alternately a conventional potentiometer, is fixedly positioned adjacent the scale element 68 to be continuously responsive to axial movement of the scale element 68 to provide a signal indicating the axial displacement and position of the scale element 68 and, hence, of the ram 24. The encoder 74 is electrically connected to the usual encoder logic, designated generally as 76, which in the conventional manner comprises a buffer or signal conditioning network 78, directly electrically connected to the encoder 74 to receive the signals therefrom and providing electrical pulses commensurate with the received signals, and an up-down counter 80 electrically connected to the buffer 78 to receive and count the electrical pulses therefrom.

The buffer 78, as will be understood, in the conventional manner matches the voltage and impedance drive levels of the encoder signals to the counter 80. The encoder logic 76 further comprises a forward-reverse logic 82 electrically connected in a shunt circuit between the buffer 78 and the counter 80, such forward-reverse logic 82 monitoring the pulses of the buffer 78 and providing the counter 80 with a signal indicating the direction (that is, forward or reverse) of the ram axial movement. The limit switch 72 is directly electrically connected to the counter 80 for signaling the latter of the commencement of each operating cycle upon each actuation of the switch 72 by the arm portion 70.

The counter 80 in the conventional manner continuously provides an output signal indicating the counted pulses. The output of the counter 80 is directly electrically connected to a conventional word comparator 84 and also to a multiplexer or switching network 86, in turn, electrically connected to a position memory circuit 88 which serves as a storage register for storing the signals received from the multiplexer 86. The output of the position memory circuit 88 is directly connected to a multiplexer or switching network 90, in turn, connected to a binary coded decimal four digit-adder-or-subtracter 92, the output of the latter being directly electrically connected to the word comparator 84 which in a conventional manner provides an output when the signal directly received from the counter 80 (that is, the signal indicating the actual position of the ram 24) equals the signal received from the adder-or-subtracter 92 (that is, as will be hereinafter described, the signal indicating a calculated ram position). The output of the adder-or-subtracter 92, is further electrically connected to the multiplexer 86, and also to a correction memory circuit 94 having its output electrically connected to the multiplexer 90. The output of the position memory circuit 88 is, moreover, electrically connected through a binary coded divide-by-two circuit 96 to a multiplexer or switching network 98 provided with a plurality of thumb-wheel switches 100, 102, 104, 106, 108 and having its output directly electrically connected to the adder-or-subtracter 92. The thumb-wheel switches 100, 102, 104, 106 are individually directly electrically connected to the multiplexer 98, the switch 102 being, however, also electrically connected to the multiplexer 98 by a shunt circuit containing a conventional binary coded divide-by-two circuit 110. The thumb-wheel switches 100, 102, 104, 106, 108 are manually controllable by the operator of the apparatus to preset predetermined desired conditions into the controlling apparatus; and, in the illustrated embodiment of the controlling apparatus, the thumb-wheel switch 100 presets the desired ram injection stroke displacement during the injection-fill stroke 54 of the ram 24, the thumb-wheel switch 102 presets a desired, extreme forward position 58 of the ram (that is, a desired length of the cushion distance 62), and the switch 104 presets the distance of axial ram travel between the ram positions 58 and 44. The switch 108 presets the distance of axial ram travel between the ram positions 56 and 58; and the switch 106 presets an estimated ram displacement distance 50.

The controlling apparatus further comprises a timing-and-sequencing logic circuit 112 which is directly electrically connected to the multiplexers 86, 90, and 98, the position memory circuit 88, the adder-or-subtracter 92 and the correction memory circuit 94, for controlling all of such components. The thumb-wheel switch 108 is electrically connected to the timing-and-sequencing logic 112 in a circuit containing a dwell comparator 114 operated by the conventional dwell timer or clock 116. The timing-and-sequencing logic circuit 112 is, moreover, directly electrically connected to an output command logic circuit 118 to, through such circuit 114 and thereto connected outputs 120, 122, 124, and 126 each provided with a conventional relay 128, selectively control the conventional molding machine control 130 in a manner to be hereinafter described. The output 120 is connected to the machine control 130 to selectively stop the ram rotation by the motor 32 and initiate the application of prepack pressure on the ram 24; and the output 122 is connected to the control 130 to selectively stop ram forward axial movement at the end of the ram injection-fill stroke. The outputs 124 and 126 are connected to the control 130 to, respectively, stop forward movement of the ram 24 when the latter is in its most forward position 58 and stop rearward ram movement when the ram 24 is in the ram position 44.

The machine control is electrically connected to input buffers 132 through four outputs 134 to electrically signal the buffers 132 of selected actual operating conditions of the molding apparatus. One of the outputs 134 is connected to the limit switch 72 to provide an electrical signal to the buffers 132 upon actuation of the switch 72, thereby indicating a reference point of the ram travel. Another output 134 is connected to provide a signal to the buffers 132 upon the commencement of ram rotation by the motor 32; while a third output 134 is arranged to signal the buffer 132 upon the commencement of the ram injection-fill stroke 54 from the ram position 52. The remaining output 134 is arranged to provide a timer activated, fail-safe closure in the event that the ram does not reach its positions within a predetermined maximum time period (that is within a time period of, for example, 200 percent of that estimated for normal operation). The buffers 132 are electrically connected to the timing-and-sequencing logic circuit 112, the output command logic circuit 118, and an indicating light controller circuit 136, to indicate to all of these the signals provided by the outputs 134. The light controller circuit 136 is shown as operating a plurality of lights 138 which may be employed for denoting different operating conditions of the ram 24 as such are signalled to the buffer 132 by the outputs 134, the light controller circuit 136, as illustrated, being connected to the adder-or-subtracter 92 to also receive output signals from the latter.

Throughout the axial displacement of the ram 24 occurring during each operating cycle of the injection apparatus 10, the position transducer 74 hence continuously provides a signal indicating the actual ram displacement and position; and the counter 80 is thereby caused to provide a corresponding signal to the word comparator 84 and the input 86b of the multiplexer 86. Also, during each operating cycle of the apparatus 10, the limit switch 72 is actuated responsive to movement of the ram 24 from its position 58 to its position 44, such actuation of the limit switch 72 serving to provide a fixed reference point for the counter 80 and to preset the counter 80 to a value predetermined for the location of the limit switch 72.

In the set-up of the controlling apparatus, the thumb-wheel switches 100 through 108 are manually operated to preset selected predetermined values of their respective variables; and the ram 24 is forwardly driven to its position 58 and then caused to move rearwardly to its position 44, thus activating the limit switch 72 to preset the counter 80.

During the first operating cycle following such set-up and with the ram 24 in said position 44, the timing-and-sequencing logic circuit 112 causes the multiplexer 98 to provide the adder-or-subtracter 92 with a signal corresponding to the injection-fill stroke length preset by the thumb-wheel switch 100, and also selects ports 86a, 90a of the multiplexers 86, 90, respectively. The adder-or-subtracter 92 resultantly provides a signal indicative of the preset injection-fill stroke length 54; and the timing-and-sequencing logic circuit 112 causes such signal to be stored in the position memory circuit 88. Then the timing-and-sequencing logic circuit 112 selects ports 86a, 90a of the multiplexers 86, 90, respectively, and also causes the multiplexer 98 to provide the adder-or-subtracter 92 with a signal corresponding to the cushion distance 62 preset by the thumb-wheel switch 102, thus causing the adder-or-subtracter 92 to provide a signal representing the total of the preset distances 54 and 62 which signal is also entered in the position memory circuit 88. The timing-and-sequence logic circuit 112 then selects ports 86a, 90a of the multiplexers 86, 90 and causes the multiplexer 98 to signal to the adder-or-subtracter 92 the distance 50 preset by the thumb-wheel switch 106. The adder-or-subtracter 92 totals the beforedescribed three signals received from the multiplexer 98 to provide a signal indicating the selected distance 46 of the rearward ram movement; and, when the signal received by the word comparator 84 from the counter 80 indicates that the ram 24 has been rearwardly axially moved such calculated distance 46 to the resultantly predetermined position 48, the comparator 84 signals the timing-and-sequencing logic circuit 112 to, in turn, accordingly signal the output command logic circuit 118. The circuit 118, upon receiving this signal, acts through the output 120 to cause the machine control 130 to stop the ram rotation and initiate the application of the prepack pressure on the ram 24, thus stopping the ram rearward movement.

The timing-and-sequencing logic circuit 112 then selects ports 86b, 90a of the multiplexers 86, 90, respectively, and causes the multiplexer 98 to signal the adder-or-subtracter 92 the injection-fill stroke 54 preset by the thumb-wheel switch 100. Simultaneously, the circuit 112 puts the adder-or-subtracter into the subtracting mode. When the machine control 130 signals the start of injection to the input buffers 132 (that is, after the ram 24 has been forwardly moved from the position 48 the variable distance 50 to the position 52 with the resultant closure of the valve 28), the buffers 132 in turn, correspondingly signal the timing-and-sequencing logic circuit 112. The circuit 112 causes the signal from the counter 80 indicating the ram position at that time to be stored in the position memory circuit 88; and the adder-or-subtracter 92 is caused to generate a signal based on the said actual ram position and the preset selected length of the ram injection-fill stroke.

When the forward driven movement of the ram 24 displaces the latter to a position wherein the signal provided by the counter 80 to the comparator 84 equals this generated signal, the comparator 84 signals the timing-and-sequencing logic circuit 112 to cause the output command logic circuit 118 to, through the output 122, signal the machine control 130 to terminate the injection fill stroke of the ram 24. The timing-and-sequencing logic circuit 112 then starts the dwell timer 116 which, after the end of the dwell time preset in the timer 116, causes the dwell comparator 114 to signal the circuit 112. Upon receipt of such signal, the circuit 112 signals the output command logic circuit 118 which, in turn, provides a signal through the output 124 to the machine control 130 to cause the latter to stop the ram forward axial movement. Simultaneously, the logic circuit 112 also enters the then actual position of the ram 24 into the position memory circuit 88.

The logic circuit 112 then selects port 90a of multiplexer 90, puts the adder-or-subtracter into the add mode and causes the multiplexer 98 to signal the adder-or-subtracter 92 in accordance with the setting of the thumb-wheel switch 104. The adder-or-subtracter 92 adds the signal received from the multiplexer 98 to the stored signal indicating the position of the ram 24 at the end of its forward driven movement; and when the word comparator 94 indicates that the ram 24 has been rearwardly axially moved to the thus computed position 44, the logic circuit 112 causes the output command logic circuit 118 to accordingly signal the machine control through the output 126 to stop the ram rearward movement, thereby completing the first operating cycle.

During succeeding operating cycles, each commencing with the ram 24 in its position 44, the logic circuit 112 selects port 86a of multiplexer 86 and port 90b of multiplexer 90, causes the multiplexer 98 to provide the adder-or-subtracter 92 with the signal provided to the multiplexer 98 through the binary coded divide-by-two circuit 96 and sets the adder-or-subtracter 92 in the subtract mode. This causes the adder-or-subtracter 92 to subtract the signal received from the multiplexer 98 from the signal stored in the correction memory circuit 94 indicating any previous errors correction. The result of this calculation of the adder-or-subtracter 92 is then entered into the position memory circuit 88; and the logic circuit 112 then selects ports 86a, 90a of the multiplexers 86, 90 and causes the multiplexer 98 to provide the adder-or-subtracter 92 with the preset signal of thumb-wheel switch 102 passing through the binary coded divide-by-two circuit 110. The logic circuit 112 selects the add mode of the adder-or-subtracter 92 and causes the latter to generate the sum of the supplied signals which sum is signalled to the correction memory circuit 94 and the position memory circuit 84.

The timing-and-sequencing logic circuit 112 then causes the multiplexer 98 to provide the adder-or-subtracter 92 with a signal corresponding to the injection-fill stroke length preset by the thumb-wheel switch 100, and also selects ports 86a, 90a of the multiplexers 86, 90, respectively. The adder-or-subtracter 92 resultantly provides a signal indicative of the preset injection-fill stroke length 54 (that is, the ram injection stroke displacement) and the new correction factor; and the timing-and-sequencing logic circuit 112 causes such signal to be stored in the position memory circuit 88. Then the timing-and-sequencing logic circuit 112 selects ports 86a, 90a of the multiplexers 86, 90, respectively, and also causes the multiplexer 98 to provide the adder-or-subtracter 92 with a signal corresponding to the cushion distance 62 preset by the thumb-wheel switch 102, thus causing the adder-or-subtracter 92 to provide a signal representing the total of the preset distances 54 and 62 which signal is also entered in the position memory circuit 88. the timing-and-sequence logic circuit 112 then selects ports 86a, 90a of the multiplexers 86, 90 and causes the multiplexer 98 to signal to the adder-or-subtracter 92 the distance 50 preset by the thumb-wheel switch 106. The adder-or-subtracter 92 totals the beforedescribed three signals received from the multiplexer 98 to provide a signal indicating the selected distance 46 of the rearward ram movement; and, when the signal received by the word comparator 84 from the counter 80 indicates that the ram 24 has been rearwardly axially moved such calculated distance 46 to the resultantly predetermined position 48, the comparator 84 signals the timing-and-sequencing logic circuit 112 to, in turn, accordingly signal the output command logic circuit 118. The circuit 118, upon receiving this signal, acts through the output 120 to cause the machine control 138 to stop the ram rotation and initiate the application of the prepack pressure on the ram 24, thus stopping the ram rearward movement.

Hence, the controlling apparatus both maintains a constant axial displacement of the ram 24 by its injection-fill stroke and also controls or varies the distance 46 of the ram rearward movement (and, hence, the ram position 48) to tend to maintain a constant ram position 58 and, hence, a constant length of cushion 62 forwardly of the ram 24 when the latter is in its position 58. The thereafter following portions of the operating cycles continue in the same manner as the corresponding portions of the earlier described first operating cycle.

FIG. 3, wherein components corresponding to those shown in FIG. 1 are designated by the similar reference numeral followed by the suffix c, fragmentarily illustrates an alternative embodiment of the controlling apparatus. The FIG. 3 embodiment is structurally different from that shown in FIG. 1 only in that the thumb-wheel switch 108c is directly electrically connected to the multiplexer 98c whereby the timing-and-sequencing logic 112c causes the overall forward displacement of the ram 24 from the variable ram position 52 (that is, with reference to FIG. 2, the total of the ram injection-fill stroke 54 and the ram displacement between the locations 56 and 58) to be also controlled in a manner similar to that in which the ram injection-fill stroke 54 has been described as being controlled. The dwell timer 116, the dwell comparator 114 and the electrical line shown in FIG. 1 as connecting the thumb-wheel switch 118 to the timing-and-sequencing logic 112, all are, of course, omitted in the FIG. 3 embodiment. The operation of the FIG. 3 embodiment is believed to be apparent from the before going description and proceeds in the same manner as the described operation of the FIG. 1 embodiment, excepting that the timing-and-sequencing logic 112c also causes calculation of the beforedescribed overall forward ram stroke from the variable position 52 and signals the machine control to stop forward movement of the ram 24 when the calculated or predetermined displacement is attained.

From the preceding description, it will be seen that the invention provides new and improved apparatus and methods for attaining all of the beforedescribed objects and advantages. It will be understood, however, that, although only two embodiments of the injection have been illustrated and hereinbefore described, the invention is not limited merely to these two embodiments, but rather contemplates other embodiments and variations within the scope of the following claims.

Having described my invention, I claim:

1. Apparatus for controlling the movement of a ram disposed in a barrel for processing fluent material therein and axially driven from a variable position substantially spaced from a barrel discharge opening towards such opening to discharge processed material therethrough, said controlling apparatus comprising means for providing a signal indicating the actual location of the ram when the ram is in such variable position, and control means for controlling at least a portion of the driven movement of the ram from such variable position towards such discharge opening dependent upon said indicated ram location for maintaining a predetermined injection stroke displacement of the ram thereby.

2. Controlling apparatus according to claim 1, wherein said control means comprises means for maintaining a predetermined overall axial displacement of the ram by the overall ram movement from said variable position towards such discharge opening.

3. Controlling apparatus according to claim 1, wherein said control means comprises means for maintaining a predetermined injection stroke displacement of the ram by ram movement from such variable position towards such discharge opening in an injection-fill stroke for initial filling of a mold.

4. Controlling apparatus according to claim 3, wherein said control means further comprises means for maintaining a predetermined overall axial displacement of the ram by the overall ram movement from said variable position towards such discharge opening.

5. Controlling apparatus according to claim 1, wherein said signal providing means comprises means for providing a signal indicating the actual location of the ram throughout its said movement.

6. Apparatus for controlling the axial movement of a ram disposed in a barrel for processing fluent material therein and cyclically axially driven towards-and-away from a barrel discharge opening, which ram during each said driven movement towards the barrel discharge opening is driven a variable distance and thereafter driven an injection-fill stroke to discharge processed material through the barrel discharge opening, such controlling apparatus comprising means for providing a signal during each cycle of the ram driven movement towards the barrel discharge opening to indicate the ram actual position after the ram has been axially displaced said variable distance, and control means for controlling the ram axial displacement during each injection-fill stroke dependent upon such indicated ram actual position to maintain the ram injection stroke displacement constant during each injection-fill stroke of the ram.

7. Controlling apparatus according to claim 6, wherein said signal providing means comprising means for continuously providing a signal indicating the ram actual position throughout at least the ram axial movement towards the barrel discharge opening.

8. Controlling apparatus according to claim 6, wherein said control means further comprises means for maintaining a predetermined overall axial displacement of the ram by overall ram movement from such variable position towards such discharge opening.

9. Molding apparatus comprising a barrel having a discharge opening, a ram in said barrel for processing fluent material therein and cyclically axially driven towards-and-away from said discharge opening, said ram during each said driven movement towards said discharge opening being first moved a variable distance to a variable axial position to prepack processed material in said barrel between said ram and said discharge opening and then moved from such variable position in an injection-fill stroke to discharge the material from said barrel through said discharge opening, and control means for said ram, said control means comprising means for providing a signal each cycle during the ram injection stroke displacement towards said discharge opening to indicate the actual axial position of said ram after said ram has been axially moved said variable distance, and control means controlling the ram injection stroke displacement during each said ram injection-fill stroke dependent upon such ram actual position for maintaining the injection stroke displacement of the ram during each injection-fill stroke constant regardless of the actual position from which said ram began such stroke.

10. Molding apparatus according to claim 9, further comprising non-return valve means associated with said ram, said movement of said ram said variable distance being sufficient to cause closing of said non-return valve means.

11. Molding apparatus according to claim 9, wherein said control means further comprises means for maintaining a predetermined overall axial displacement of the ram by overall ram movement from such variable position towards such discharge opening.

12. The method of controlling the movement of a ram disposed in a barrel for processing fluent material therein and axially driven from a variable position to discharge processed material through a barrel discharge opening, said method comprising the steps of determining the actual position of the ram when the ram is in said variable position, and controlling at least a portion of the driven movement of the ram from such variable position towards such discharge opening dependent upon such actual position to maintain a predetermined injection stroke displacement of the ram thereby.

13. The method according to claim 12, wherein the overall axial displacement of the ram by overall ram movement from such variable position towards such discharge opening is so controlled.

14. The method according to claim 12, wherein the ram is cyclically driven towards-and-away from the barrel discharge opening, and said steps are repeated during each driven movement of the ram towards the barrel discharge opening to maintain a constant injection stroke displacement of the ram by each said injection-fill stroke thereof.

15. The method for controlling the movement of a ram disposed in a barrel for processing fluent material therein and cyclically axially driven towards-and-away from the barrel discharge opening, wherein the ram during each said driven movement towards the barrel discharge opening is axially displaced a variable distance to a variable position and thereafter driven an injection-fill stroke to discharge processed material through the barrel discharge opening, said method comprising the steps of, during each cycle, determining the ram actual position after the ram has been axially displaced said variable distance, and controlling the ram injection stroke displacement during each said injection-fill stroke dependent upon such determined actual position to maintain the ram injection stroke displacement constant by each injection-fill stroke of the ram.

16. The method according to claim 15, wherein the ram axial displacement to said variable position is employed for closing a non-return valve associated with the ram.

17. The method according to claim 16, wherein the overall axial displacement of the ram by overall ram movement from such variable position towards such discharge opening is also so controlled.

18. Apparatus for controlling the movement of a ram disposed in a barrel for processing fluent material therein and axially driven from a variable position substantially spaced from a barrel discharge opening towards such opening to discharge processed material therethrough, said controlling apparatus comprising means for providing a signal indicating the actual location of the ram when the ram is in such variable position, and control means for controlling the driven movement of the ram from such variable position towards such discharge opening dependent upon said indicated ram location for maintaining a predetermined overall axial displacement of the ram thereby.

19. The method of controlling the movement of a ram disposed in a barrel for processing fluent material therein and axially driven from a variable position to discharge processed material through a barrel discharge opening, said method comprising the steps of determining the actual position of the ram when the ram is in said variable position, and controlling the driven movement of the ram from such variable position towards such discharge opening dependent upon such actual position to maintain a predetermined overall axial displacement of the ram thereby.

* * * * *